United States Patent [19]

Gery

[11] Patent Number: 4,525,711
[45] Date of Patent: Jun. 25, 1985

[54] THREE-DIMENSIONAL FIBER OPTIC DISPLAY

[76] Inventor: Alan R. Gery, 20 Serpentine La., Old Bethpage, N.Y. 11804

[21] Appl. No.: 414,986

[22] Filed: Sep. 3, 1982

[51] Int. Cl.³ .......................... G09G 3/22; G09G 1/00
[52] U.S. Cl. ............................... 340/815.31; 340/700;
340/795; 340/720; 358/901; 313/475
[58] Field of Search .................... 340/815.31, 815.07,
340/815.06, 700, 705, 780, 795; 358/237, 90, 88,
89, 200, 901; 250/227; 313/372, 475

[56] References Cited

U.S. PATENT DOCUMENTS

| 2,578,970 | 12/1951 | Gannaway . | |
| 2,749,480 | 6/1956 | Ruderfer . | |
| 2,777,011 | 1/1957 | Marks . | |
| 3,043,179 | 7/1962 | Dunn | 313/475 |
| 3,138,796 | 6/1964 | Withey . | |
| 3,140,415 | 7/1964 | Ketchpel . | |
| 3,154,636 | 10/1964 | Schwertz . | |
| 3,177,486 | 4/1965 | Crooker . | |
| 3,234,329 | 2/1966 | Eisner | 340/795 |
| 3,518,367 | 6/1970 | Smith | 358/90 |
| 3,585,433 | 6/1971 | O'Keefe . | |
| 3,636,551 | 1/1972 | Maguire | 340/780 |
| 3,662,381 | 5/1972 | Steffens | 340/815.31 |
| 3,744,048 | 7/1973 | Treichel . | |
| 3,786,500 | 1/1974 | Fiorletta . | |
| 3,789,521 | 2/1974 | Way et al. . | |
| 3,836,911 | 9/1974 | Gibson et al. . | |
| 3,878,329 | 4/1975 | Brown . | |
| 4,016,534 | 4/1977 | Kobayashi et al. | 340/815.31 |
| 4,023,158 | 5/1977 | Corcoran . | |
| 4,041,476 | 8/1977 | Swainson | 340/795 |
| 4,090,104 | 5/1978 | Vann et al. | 358/901 |
| 4,279,089 | 7/1981 | Murakami | 340/815.31 |
| 4,280,122 | 7/1981 | McKinley et al. | 340/815.31 |
| 4,311,999 | 1/1982 | Upton et al. | 340/815.31 |

FOREIGN PATENT DOCUMENTS 2548589 10/1975 Fed. Rep. of Germany ...... 358/901

Primary Examiner—Gerald L. Brigance
Attorney, Agent, or Firm—Jones, Tullar & Cooper

[57] ABSTRACT

A three-dimensional display device incorporating a large number of illumination points located in a regular pattern within a three-dimensional display region is disclosed. The display region is defined by an optically transparent housing, while the illumination points are the exit tips of wave guides such as optical fibers. The fibers are arranged in bundles mounted vertically within the display region, with each bundle consisting of a large number of parallel optical fibers joined together and each fiber terminating in an exit tip at a different location along the longitudinal axis of the bundle. The use of a multiplicity of bundles, each containing fibers arranged in a matrix and having mutually displaced exit tips, produces a large number of illumination points arranged in a three-dimensional lattice within the display region, with each illumination point being definable by its corresponding bundle and its location within that bundle matrix. The ends of the fibers extend out of the display region to light source locations where the input ends of the individual fibers in each bundle interface with suitable light sources such as individual light emitting diodes or a specially adapted cathode ray tube. Information such as the matrix coordinates of illumination points to be activated is stored and processed by a computer or microprocessor to activate selected light sources, whereby an illumination pattern is produced in the display region.

18 Claims, 10 Drawing Figures

THREE-DIMENSIONAL FIBER OPTIC DISPLAY

BACKGROUND OF THE INVENTION

The present invention relates, in general, to three-dimensional display devices, and more particularly to an optical system for providing visual displays of information in three dimensions.

The need for an effective, reliable, easy to use, three-dimensional optical display of information has long been recognized. Such displays are of particular value in air traffic control, where a visible display of aircraft location in three dimensions is of great assistance in directing traffic around airport locations. Other significant applications of such displays exist within the fields of education, art, mathematics, physics, chemistry, structural design, and the like. Although two-dimensional representations of images, such as may be provided in cathode ray tube graphical displays, have been greatly improved, such displays are not totally satisfactory, and accordingly the production of true three-dimensional displays has been the focus of much attention and technical innovation in recent years.

A true three-dimensional display profoundly improves the representations which have been available through two-dimensional imaging, for a true three-dimensional image occupies a fixed three-dimensional space or region and allows the viewer to actually move around the representation to obtain perspectives of the displayed image. This enables the viewer to develop his understanding of the displayed material in a manner compatible with his own sense of position, direction, proportion, and perspective. Accordingly, the development of apparatus for producing a true three-dimensional image has been highly desired and has long been sought, but effective solutions have not been found.

Devices such as those illustrated in U.S. Pat. Nos. 2,749,480 to Ruderfer and 3,636,551 to McGuire are typical of the approaches that have been taken in the prior art, with each providing individual lamps scattered through a three-dimensional region and interconnected by a matrix of wires so that individual lamps may be illuminated by suitable switching. Such devices require complex wiring harnesses located within the region of the display, thus significantly reducing the transparency of the region and interfering with the light pattern. Furthermore, since the lamps utilized in these devices are relatively large and bulky, they are themselves a cause of severe interference and distortion, and do not provide the effective point sources of illumination that are required for detailed, accurate displays. Further, even the smallest lamps require relatively thick wires for support, as well as for the supply of electric current, and the transparency of the display region is adversely affected. Thus, there has been a long standing need for an effective optical display system which would enable a user to provide true three-dimensional illustrations of patterns, designs, forms, graphs, and the like to provide a true visual reproduction of an image.

SUMMARY OF THE INVENTION

The present invention provides a true three-dimensional illustration of graphical displays and the like through the provision of an array of optical fibers located within a display region. The fibers are mounted within the region in groups, or bundles, each bundle consisting of a large number of parallel optical fibers arranged in a matrix, with each fiber terminating at one end in an exit tip. These tips are located at different positions along the axis of the bundle, so that the bundle is tapered to facilitate viewing of the illuminated tips. The opposite, or inlet, tip ends of the fibers are connected outside the display region to corresponding sources of light which may be selectively activated to produce illuminated points within the display region, the outlet tips of the selected fibers acting as point sources of light. By staggering the termination points to produce a tapered bundle, and by making each fiber sufficiently thin and transparent, the exit tip of each fiber will be visible outside the display region. Through energization of selected light sources at the inlet ends of the fibers a selected light pattern can be produced within the display region, which, when viewed from the outside, produces a true three-dimensional optical image.

As is known, optical fibers are extremely thin, pliable strands of glass which conduct light from one end to the other, with negligible loss through the side walls. When light is projected into one end of a strand, which may be referred to as the input end, or input tip, that light will exit virtually undiminished from the other end, which may be referred to as the output or exit tip. These fibers can be designed to emit light with varying degrees of sharpness and brightness, whereby emitted light appears to be produced at a point source. These fibers are currently being made commercially with diameters as small as 125 microns, and theoretically can be made with substantially smaller diameters without loss of function. The present invention utilizes such optical fibers to display a selectable pattern of lights within a display region.

The display region in which the fibers are located may be defined by a transparent structure consisting of a glass or clear plastic shell, which may take the form of a dome, a cylinder, or any other desired shape. In one form of the invention, the shell is mounted on a wall, or floor, and encloses a large number of optical fiber bundles mounted vertically on the floor and, as required, supported from the top of the shell. Each optical fiber bundle contains a multiplicity of display fibers having exit tips located at different locations along the length of the bundle so that the bundles are tapered and preferably contains a support fiber which extends the entire height of the shell to hold the bundle in an upright position. A plurality of similar bundles are arrayed within the shell so that the display fibers provide a large quantity of exit tips in a three-dimensional lattice. The bundles extend through the floor where the input ends of the fibers are associated with corresponding light sources which, upon activation, produce corresponding point sources of light at the exit tips within the display region.

Each tapered fiber bundle is vertically mounted within the display structure. In one form of the invention, the longest display fiber of a bundle extends virtually the entire height of the display region, while the exit tip of the shortest fiber is near the floor of the region, with the remaining fibers of the particular bundle having exit tips spaced evenly along the length of the bundle between the top and bottom of the display region.

A second embodiment of the invention may utilize a display region having walls at opposite ends, with a cylindrical transparent wall of glass or plastic being mounted therebetween and defining the display region.

In this arrangement, the fibers and fiber bundles can all be suspended from the top wall, with the support strand of each bundle reaching to and being attached to the bottom wall for securing the bundles and the display strands reaching down varying lengths to provide tapered bundles which provide the desired three-dimensional effect. The support strand can be omitted, if desired.

Another embodiment incorporates the features of the two arrangements described above, wherein each bundle of fibers extends between a top wall and a bottom wall of the display region, but where each bundle is tapered both downwardly and upwardly from the center of the region. In this arrangement, the input ends of one half of the total number of fibers in a bundle extend through one end wall, and the remainder extend through the other wall, with each individual strand being individually illuminated from above or below the display region, as appropriate. At least one support strand may be provided, extending the full height of the display region.

The cross sectional shape of each optical fiber bundle may depend upon the shape of the display region, upon the desired density of bundles within the region, and like factors. Within each bundle, the optical fibers may be arranged in any desired pattern, although a rectilinear pattern is preferred. Each fiber is secured flush against adjacent fibers, and each exit tip of a given bundle lies at a different height, or axial location, along the length of the bundle. The axial spacing of adjacent exit tips is a function of the height of the display region and the number of fibers within a single bundle. The number of exit tips per unit volume within the display region will depend further on the number of bundles and their spacing within the region. Within each bundle each exit tip will be differently displaced radially from the central axis of the bundle; however, the extremely small diameter of the fibers in each bundle produces radial displacements that are so small that all of the tips along the length of a bundle will appear upon visual inspection to be located essentially on a single vertical line.

Because optical fibers are transparent, the fibers in a bundle produce little interference with the light emitted from the various tips within that bundle, although interference will not be completely eliminated. Some blockage occurs by reason of the proximity of adjacent bundles, although the light from a given tip will, to a certain extent, be visible through and around adjacent fibers. This blockage increases as the number of fibers in a bundle increases, and becomes a factor in the display system primarily near the ends of the bundles adjacent the display region bottom wall, or in the case of a double-tapered bundle, near the top and bottom walls, where the largest number of fibers are located. However, this blockage of light by adjacent fibers in a bundle is generally insignificant when compared to the blockage of light that occurs in prior three-dimensional devices.

Because the bundles appear to provide line sources of light, they can be located closely together within a display region to provide a high density light array, or can be located further apart to produce a low density display. As the number of bundles is decreased to provide a low density display, the transparency of the display region will increase, since there will be less interference with the light emitted from the fiber tips in a bundle. The illuminated tips will be more easily visible from outside the display region, but the display images will be less accurate.

As additional bundles are incorporated into the display region and the fiber exit tip density increases, there is greater interference with the light being emitted, and a consequent reduction in visual clarity. Further, an increase in the number of bundles causes an increased amount of light reflection within the display area, further reducing clarity. At the same time, an increase in the number of available illumination points results in an increased accuracy in the display and allows a greater diversity in the images that can be produced.

The undesirable effects if reflection can be reduced by decreasing the intensity of the light emitted from the fiber tips, but such a decrease in intensity reduces the clarity of the image. Thus, the selection of fiber thickness, bundle configuration, light intensity and fiber bundle density within the display region involves a trade-off between visual transparency and display diversity and clarity.

A key factor in obtaining the desired accuracy of display in the present invention is the light source and control system for activating the individual fibers. In the present invention, it is contemplated that each fiber will be individually excited by a corresponding source of light, and to this end the fibers in each bundle are separated after passing through the top or bottom walls of the display region for connection to a suitable activation device. One type of activation device may be an array of light emitting diodes, with each fiber input tip being connected to a single corresponding light emitting diode. Although this arrangement provides the required control, the large number of light emitting diodes becomes cumbersome as the fiber density and size of the display region increase.

A preferred activation device is the use of one or more specially adapted cathode ray tubes, each tube carrying on its surface a thin sheet of plastic or other appropriate material perforated with a multiplicity of small holes adapted to receive corresponding input tips of the individual fibers. These fibers are then activated by means of light produced by the phosphor on the face of the cathode ray tube, which itself is activated by the electron beam, in conventional manner. The phosphor may be used to stimulate any fiber or subset of fibers to produce light at the corresponding exit tips. A suitable control system is provided for the cathode ray tube to regulate the deflection and intensity of the electron beam, with the surface activation point on the tube being uniquely identifiable and selectable, so as to select specified fiber exit tips.

BRIEF DESCRIPTION OF THE DRAWINGS

The foregoing and additional objects, features and advantages of the present invention will become apparent to those of skill in the art from a consideration of the following detailed description of preferred forms of the invention, taken in conjunction with the accompanying drawings, in which.

DESCRIPTION OF THE PREFERRED EMBODIMENTS

Figure 1:
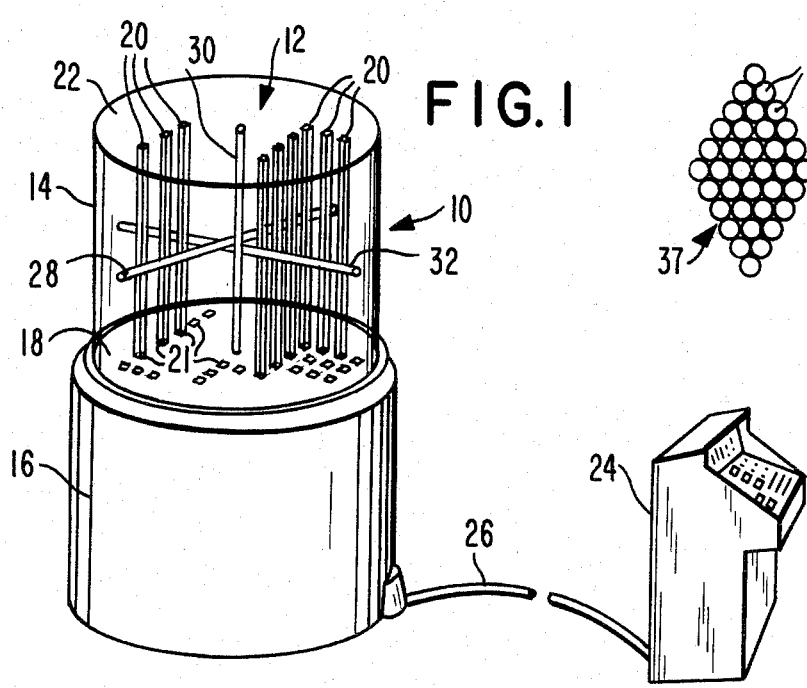
FIG. 1 is a diagrammatic view of a three-dimensional optical display device and control system constructed in accordance with the present invention.

Turning now to a more detailed consideration of the present invention, there is illustrated in FIG. 1 in diagrammatic form a three-dimensional display device 10 constructed in accordance with one form of the present invention. The display device includes a display region generally indicated at 12, which may be defined by a glass or transparent plastic shell 14. In this illustration, the shell is generally cylindrical in form, but it will be evident that other shapes may also be provided. The shell is mounted on a base unit 16 which acts as a support for the shell and which contains the light activation device to be described. The top wall 18 of the base unit forms the floor of the display region 12 and provides support for a plurality of bundles 20 of optical fibers. Although only a very few bundles are illustrated in FIG. 1 for clarity of illustration, it will be understood that the display region 12 may be filled with such bundles, with the spacing between adjacent bundles being selected to obtain the desired light source density. Adjacent bundles would be closely spaced to obtain a high density of light sources; alternatively the adjacent bundles would be widely spaced to obtain a low density. The bundles are so mounted as to be parallel to each other, and thus may be secured to the wall 18 and extend perpendicularly upwardly, or may be secured at their upper ends to the top wall 22 of shell 14, or both. It will be understood that the arrangement of FIG. 1 is illustrative only, and that the shell 14 may, for example, be mounted on the side of the base unit 16 so that the bundles 20 extend horizontally out from the base unit. If desired, other suitable orientations may be provided, as well as other configurations of the shell and base units. For purposes of convenience in description, however, the optical fiber bundles will be considered to extend vertically between the horizontal wall 18 of the base unit 16 and the top wall 22 of the shell 14.

The floor of the display region formed by wall 18 preferably is non-reflective, with the lower ends of the fiber bundles 20 passing through apertures 21 in the wall into the base unit for connection to suitable light sources. The light sources are connected to the lower or inlet ends of the individual fibers which constitute the bundles 20, and these individual light sources are controlled by suitable means such as a program-controlled microprocessor. Alternatively, or additionally, the light sources may be controlled by manually operated switches, or by manual control of the microprocessor, in conventional manner. The controls for the light sources are located in a console 24 connected to the base unit by way of a cable connector 26. The microprocessor or other control serves to activate for selected durations selected light sources either simultaneously or in any sequence. When activated, the light sources illuminate the exit tips of corresponding optical fibers, thereby producing within the display region a selectable pattern or patterns of light representing a desired graphical or three-dimensional form. The control console may be used to permit manual activation of individual fibers or sets of fibers, or may permit programming of the microprocessor to select the fibers or subsets of fibers that are to be illuminated for display purposes. By proper selection of the duration of illumination for each lamp, the display can be static or variable, as desired.

An optical feature of the invention may be the provision within the display region of reference axes such as a horizontal axis 28 which may be designated, for example, the X-axis, a vertical axis 30, which may be designated the Y-axis and which is perpendicular to axis 28, and a second horizontal axis 32, which may be designated the Z-axis and which is perpendicular to the plane defined by the X and Y axes. These axes may be in the form of fibers or wires located within the display region, may be long, thin light bulbs, or, in a preferred form, may be fiber bundles receiving light of a different color than that used in the remainder of the display so that the axes stand out. These axis bulbs or fiber bundles may be suitably secured to the shell 14 and to the wall 18, with suitable electrical or optical fiber leads extending into the base unit 16, as required. Such axes are useful in orienting the viewer, and are particularly valuable in the situation where graphical information is being displayed.

The bundles 20 of optical fibers diagrammatically illustrated in FIG. 1 are shown as being columnar for purposes of illustration. In reality, however, these bundles are made up of a large number of individual optical fiber strands 34, each of which has a different axial length, so that the bundles are tapered in the manner illustrated in FIGS. 2 or 4. Accordingly, the exit tip 36 of each strand in each bundle is at a different axial location with respect to the bundle in order to provide the required distribution of light sources vertically along a bundle, and thereby throughout the display region.

Figure 3A:
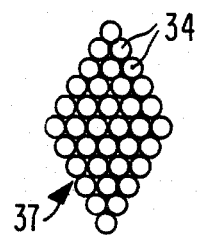
FIG. 3A is a top view of a modified form of the fiber bundle of FIG. 2.
Figure 2:
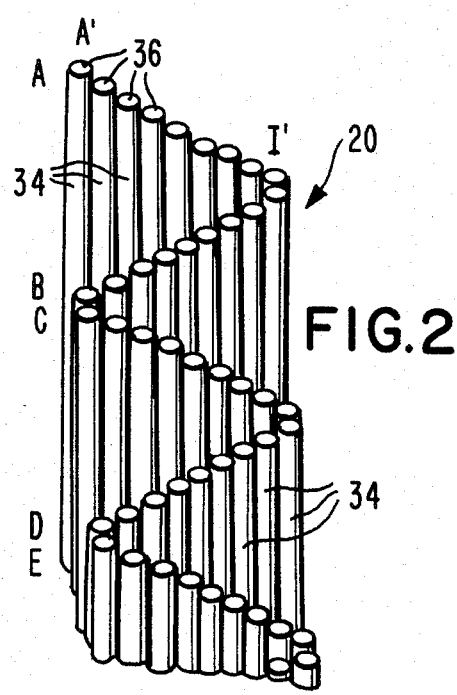
FIG. 2 is an enlarged view of an optical fiber bundle, illustrating the tapered arrangement of the fibers.
Figure 3:
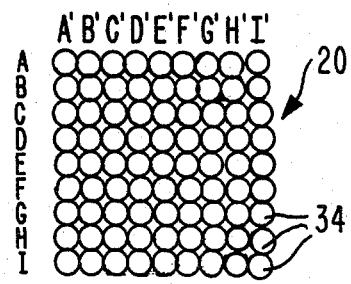
FIG. 3 is a top view of the fiber bundle of FIG. 2.

The individual fiber strands in each bundle may be arranged in any desired pattern, the strands 34 in FIG. 2, for example, being arranged in side-by-side relationship so as to provide rows A-I and columns A'-I' of strands as viewed from the top and illustrated in FIG. 3. Thus, the rows and columns produce a rectangular bundle of fibers in a matrix wherein each fiber is individually identifiable by its coordinate location; i.e., the fiber at the top left corner in FIG. 3 may be identified as A-A', the fiber at the top right corner as A-I', and so on. As indicated in FIG. 2, the strands in row A may be the longest strands in the bundle, but decrease in length from column A' through I'. The strands in row B are all shorter than the strands in row A, and decrease in length from column I' to column A', and so on throughout each of the rows. Thus, the bundle 20 includes strands of differing axial length, each of which can be identified by a matrix position, and can thus be individually selected for illumination by a suitable light source. Each of the other bundles 20 within the display region are similarly tapered, with the strands in each bundle being similarly identifiable. In this manner, each of the strands in each of the bundles located within the display region can be selectively located and illuminated to provide the desired display.

A modification of the strand pattern of FIG. 3 is diagrammatically illustrated in FIG. 3A, wherein the rectangular row and column relationship of the fibers 34 is skewed to form a rhombic array 37. The array may be skewed to form, for example a 60° acute angle at its opposite corners instead of the 90° angles shown in the arrangement of FIG. 3. This orientation allows a closer packing of the fibers, so that a larger number can be included in a specified area, if desired, while retaining the generally rectilinear pattern described with respect to FIG. 3.

Figure 4:
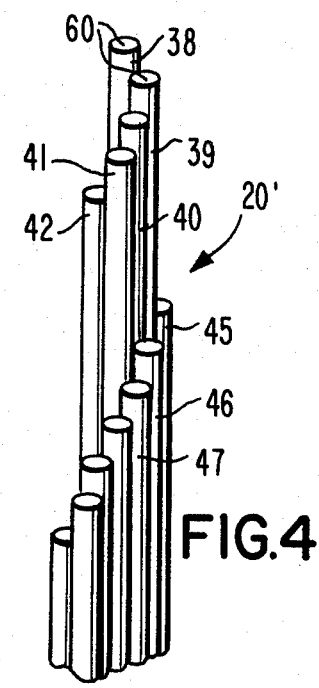
FIG. 4 is a view of another form of optical fiber bundle.
Figure 5:
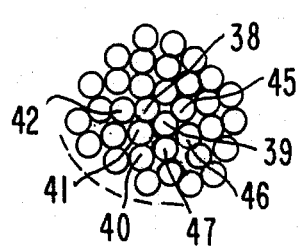
FIG. 5 is a top view of the bundle of FIG. 4.

The fiber bundles can take a variety of crosssectional shapes; preferably they will be polygonal, and in most cases will take the rectangular or rhombic shapes shown in FIGS. 3 and 3A. However, a circular bundle can be provided, if desired, as illustrated in FIGS. 4 and 5, wherein the individual strands of a circular bundle 20' are arranged in a spiral matrix. In this case, strand 38 is identified as the central strand and the remaining strands 39, 40, 41 . . . n are located adjacent to strand 38 and to each other in the spiral arrangement illustrated in the top view of FIG. 5, with the individual strands being held tightly together in a single bundle, as before, and each strand having an exit tip 60. In such an arrangement, each strand can be identified and individually illuminated, as is the case with the arrangement of FIG. 2, thereby permitting illumination of a corresponding exit tip in response to activation of a selected input light source.

The necessary cohesion between the individual fibers that make a given bundle may be achieved by means of fine, accurate spot welds or by adhesives to hold the individual strands in position, thereby to maintain structural integrity of the bundles to insure accuracy of the displayed light patterns.

The strands in the bundle of FIG. 2 are shown as being arranged in a 9×9 matrix, but it will be understood that any desired number of strands may be used, and that it is not necessary to have the same number of columns and rows. Also as illustrated in FIGS. 2 and 4, it is desirable to have the adjacent strands differ in axial length by equal amounts so that the exit tips 36 of the strands produce a uniform pattern along the length of the bundle.

Because the effectiveness of the visual display produced by the present invention is a function of the fiber exit tip density, which is the number of exit tips per unit volume within the display region, the selection of the number, shape and arrangement of bundles within that region becomes extremely important. As the fiber exit tip density decreases, transparency of the display region increases, since there is less interference between adjacent fiber bundles; however, the number of point sources of light is also reduced and this decreases the accuracy with which a desired image can be represented within the three-dimensional display region. As the exit tip density is increased, on the other hand, the detail and accuracy with which an image can be displayed increases due to the greater number of possible illumination points, but at the same time the transparency of the display region is decreased by the physical presence of additional and/or thicker fiber bundles. In the fiber arrangements illustrated in FIGS. 2 and 4, bundle thickness is at its greatest near the bottom of the display region, where the fibers pass through the bottom wall 18, so that the bottom half of the display region, is less transparent, on the average, than the top half. The bundles are thinnest at the top of the display region, so the display region has its greatest transparency at that location.

Figure 6:
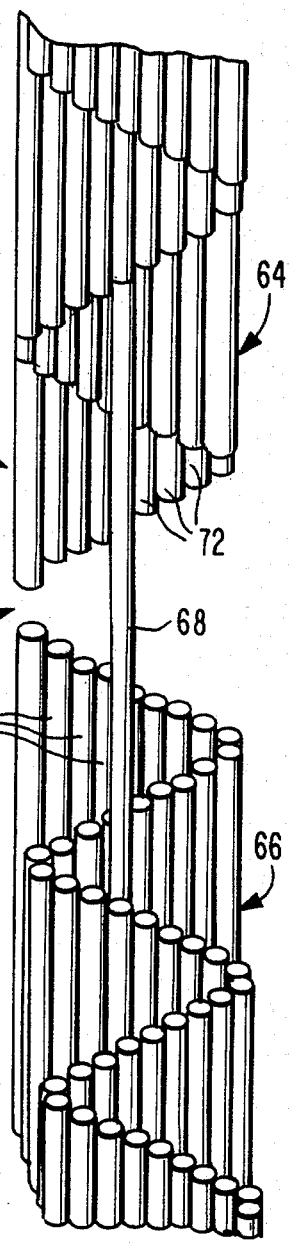
FIG. 6 is an enlarged partial view of a double tapered optical fiber bundle.

In order to reduce the average thickness of a bundle for any given fiber exit tip density, and in order to provide a more even distribution of the region transparency, the alternative configuration illustrated in FIG. 6 is highly desirable. In this double-tapered configuration, a bundle 20" is thinnest at its center portion 62 and has an upper portion 64 which tapers upwardly toward its thickest region at the top wall of the display region, and has a lower portion 66 which tapers downwardly toward its thickest portion at the bottom of the display region. A single fiber strand 68 extends the full height of the display region to serve as a support and guide for aligning the upper and lower portions 64 and 66.

The individual strands 70 which make up the lower portion 66 may be arranged in any desired matrix configuration, and thus may be in the rectangular form illustrated in FIG. 3 and described with respect to FIGS. 2 and 3, may be in the rhombic form shown in FIG. 3A, may be in the spiral form illustrated in FIGS. 4 and 5, or may take some other configuration, as desired. The strands 72 of the upper portion 64 of the bundle may have a configuration similar to that of the lower portion, or may be differently configured, as desired. The fibers in both the upper and lower portions of the bundle are tapered so that the exit tips of adjacent strands are equally spaced along the length of the bundle in the manner described with respect to FIGS. 2 and 4.

Figure 8:
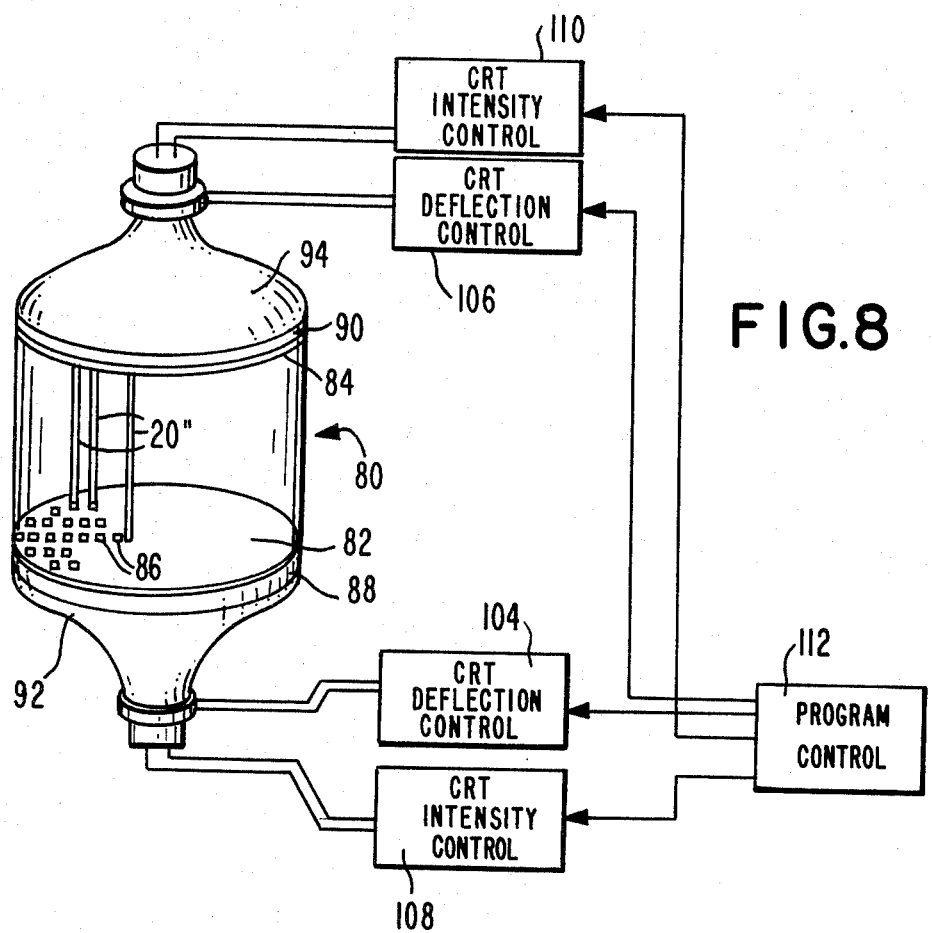
FIG. 8 is a diagrammatic illustration of a second embodiment of the three-dimensional display device of the present invention illustrating a second embodiment of the light source therefor.

In the double-tapered arrangement of FIG. 6, the input ends of the individual strands in the lower portion 66 of the bundle extend through the bottom wall 18 of the display region, while the input ends of the strands for the upper portion 64 extend through the top wall 22 of the display region into a suitable housing in the manner to be described with respect to FIG. 8. This double-tapered arrangement not only distributes the bundle thickness more evenly across the height of the display region, but also reduces the average bundle thickness, thus improving the transparency of the devide without reducing the number of illumination points. In addition, the double-tapered arrangement reduces the amount of fiber required per bundle, thereby reducing material costs, weight, and the like.

Figure 7:
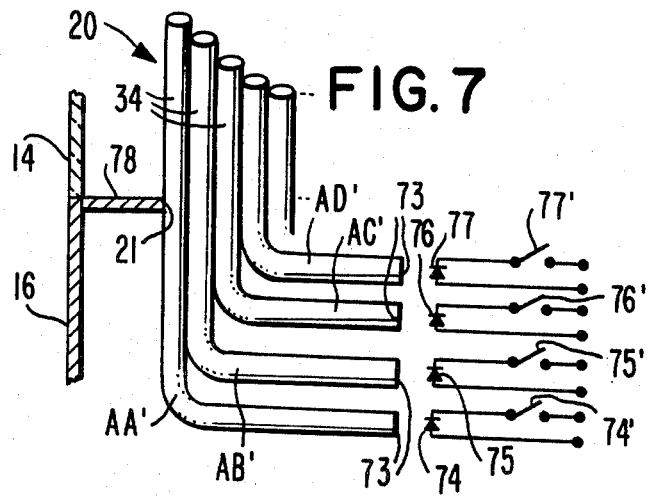
FIG. 7 is a diagrammatic illustration of one form of light source for the inlet ends of the optical fibers used in the device of FIG. 1.

Illumination of the individual fiber strands can be accomplished in a variety of ways. As illustrated in FIG. 7, the individual fibers 34 of a bundle 20, such as the fibers A-A', A-B', A-C' and A-D', etc. (see FIG. 3, top row), pass through the floor 18 of the display region into the housing 16, where the individual fibers are separated so that the input tip 73 of each fiber can be connected to a corresponding and uniquely identifiable light source. The light sources for the individual fibers may consist of an array of light emitting diodes (LEDs) 74, 75, 76, 77, etc., with each individual LED being controllable by an individual corresponding switch, 74', 75', 76', 77', etc. These switches may be manually operable switches, but preferably are solid-state devices controllable by a suitable microprocessor or like device capable of handling the large number of LEDs required for a display device.

Although the use of individual LEDs for activating individual fibers to produce illumination points within the display region is feasible for smaller displays, the large number of fibers that would normally be used in a display system would require an extremely large number of LEDs and switches, and would make the construction and operation of the device cumbersome, even with a microprocessor controller, since a single LED or similar illumination source would be required for each fiber.

It will be understood that in the case of the double-tapered arrangement of FIG. 6, a portion of the light sources would be provided in the lower housing 16 and the remaining light sources would be provided in a similar upper housing located above the top wall of the display region. Further, it will be understood that FIG. 7 shows the connections for only a few fibers from a single bundle, whereas it is contemplated in accordance with the present invention to provide a light source for each fiber in each bundle in order to provide maximum control over the display region. It is, of course, possible to connect the input tips of sets of fibers to a common light source for simultaneous illumination, and such an arrangement may be desirable for producing illuminated reference lines, such as the axes 28, 30 and 32 described above. However, the same effect can be produced with greater flexibility by proper manipulation of the control switches.

FIG. 8 illustrates a display region 80 of the type particularly suited to the double-tapered fiber bundles of FIG. 6, several of which are diagrammatically illustrated at 20″ within the display region. These fiber bundles extend between a bottom wall 82 and a top wall 84 of the display region, with the input ends of the bundles passing through apertures 86 in the upper and lower walls for connection to suitable light sources. As previously indicated, the double-tapered bundles preferably are supported between the upper and lower walls by means of at least one fiber which extends the entire distance, the remaining fibers of the bundles terminating at different axial positions along the length of the bundle to provide spaced exit tips along the length of each bundle. The input ends of the bundles extend through the walls 82 and 84 into lower and upper housings 88 and 90, respectively, for connection to suitable light sources. Although the double housing arrangement shown in FIG. 8 is particularly useful with the fiber bundle arrangement of FIG. 6, the single-taper bundle configuration of FIGS. 2 and 4 may also be used, with the input ends of some of the bundles extending downwardly into housing 88, and the input ends of the remainder extending upwardly into housing 90. Such an arrangement would also serve better to distribute the bundle thickness throughout the display region, although the double housing does restrict the field of vision into the display region.

If desired, the light source used in the double-ended configuration of FIG. 8 may be light emitting diodes associated with each strand in the manner described with respect to FIG. 7; however, a preferred form of the invention contemplates the use of one or more cathode ray tubes as the light source in combination with any of the optical fiber arrangements discussed herein. In the embodiment of FIG. 8, cathode ray tubes 92 and 94 are mounted on the lower and upper housings 88 and 90, respectively, for supplying the light sources required by the fibers mounted in display region 80.

Figure 9:
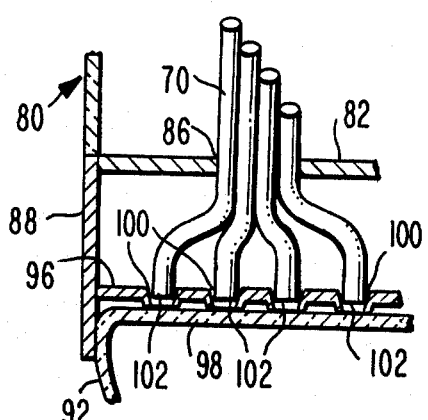
FIG. 9 is an enlarged partial view of the alternate light source of FIG. 8.

In a preferred form of the invention, each of the cathode ray tubes 92 and 94 is provided with an aperture mask, such as the mask 96 illustrated in FIG. 9 associated with the face 98 of cathode ray tube 92. Mask 96 is a sheet of opaque plastic or other suitable material perforated by a multiplicity of small, closely spaced apertures 100. Each aperture is adapted to receive the input tip 102 of an individual fiber strand such as the strands 70 of the double-tapered bundle illustrated in FIG. 6. The apertures 100 receive the input tips 102 and secure them in a predetermined position with respect to the face plate 98, thereby positioning these input tips in a predetermined matrix. A similar mask is provided for cathode ray tube 94, so that by suitably controlling the deflection of the electron beams for the cathode ray tubes, as by means of conventional deflection control circuitry 104 and 106 (FIG. 8) and by regulating the intensity of the electron beams by means of conventional intensity control circuits 108 and 110, the phosphor coatings on the interior surfaces of the cathode ray tube faces are selectively activated to produce light, whereby the cathode ray tubes act as a controllable light source for each of the input tips.

The intensity and deflection of the electron beams in the two cathode ray tubes is controlled by means of a suitable programmable controller such as a microprocessor 112 so that the exit tips of the individual fibers can be caused to emit light in a controllable pattern, or lattice. Since each point on the face of the cathode ray tubes is uniquely selectable by the tube control circuitry, various light patterns can be produced within the display region 80, thereby reproducing a desired light image. Since the light image is produced by a program for controlling the deflection and intensity of the cathode ray beams, such programs can easily be created, stored, and reproduced at will.

The cathode ray tubes 92 and 94 are shown as being located on vertical axes, but it will be understood that other convenient orientations can be used. Further, although two tubes are illustrated, it will be understood that the number of tubes used will depend upon the number of fibers used in the display region, the size of the cathode ray tube, the accuracy with which the tube face illumination can be controlled, and thus the number of fibers that can be illuminated by a single tube, and like factors. An important feature of the cathode ray tube light source is the rapidity with which the electron beam spot can be moved, and the persistence of the light emitted by the phosphor on the tube, so that after the beam is moved or extinguished, the light will remain for a period of time to permit the production of a three-dimensional image by a scanning electron beam. The image can be varied by changing the intensity of the electron beam in sequential scans, so that images of varying duration can be produced.

Although the present invention has been disclosed in terms of preferred embodiments thereof, it will be understood that numerous variations and modifications may be made without departing from the true spirit and scope thereof as defined in the following claims:

What is claimed is:

1. A three dimensional optical display device, comprising;
   a display region having at least one end portion;
   a plurality of elongated fiber bundles located within said display region, said bundles being mounted in side-by-side relationship, with each said bundle consisting of a multiplicity of parallel, close-spaced optical fibers, each fiber in a bundle having an inlet tip and an exit tip;
   light source means located outside said display region, said bundles extending through said end portion for connection of said fiber inlet tips to said light source means for activation of individual fibers by said light source means; and control means for energizing said light source means to activate only selected individual fibers, whereby selected fiber exit tips are illuminated to produce a visible light pattern within said display region.

2. The display device of claim 1, wherein each fiber in a bundle is of a different axial length, whereby said bundles are tapered to provide a multiplicity of illumination points along the length thereof.

3. The display device of claim 2, wherein said multiplicity of fibers in a bundle are arranged in a matrix, whereby the position of each fiber is identifiable for selection by said control means.

4. The display device of claim 2, wherein at least one fiber in each bundle extends the full height of said display region, the remaining fibers in each bundle being progressively shorter whereby the exit tips of individual fibers are spaced along the axial length of the bundle.

5. The display device of claim 4, wherein said light source means includes a multiplicity of individual sources, each source being associated with an individual corresponding fiber.

6. The display device of claim 4, wherein said light source means comprises:
  a cathode ray tube having a face and electron beam capable of scanning said face to produce selective illumination thereof; and
  a perforated mask covering said face, said mask having a multiplicity of closely spaced apertures for receiving the inlet tips of said optical fibers, whereby illumination of a selected portion of the face of said cathode ray tube produces illumination at the exit tips of optical fibers connected to said perforated mask at locations corresponding to the area of cathode ray tube illumination.

7. The display device of claim 6, further including control means for regulating the illumination of said face, whereby a selected pattern of illumination is produced within said display region.

8. The display device of claim 2, wherein said bundles are tapered in two directions, each bundle being thinnest at a central portion and tapering in opposite directions along the length thereof.

9. The display device of claim 8, wherein said multiplicity of fibers in a bundle is at its greatest density at the opposite ends of each said oppositely tapered bundle, thereby decreasing the number of fibers toward said central portion of said bundle and producing exit tips along the axial length of said bundle.

10. The display device of claim 9, wherein only a single fiber extends the full length of said bundle to provide support for an alignment of said bundle.

11. The display device of claim 10, wherein the fibers at each inlet tip end of said bundle are arranged in matrices, whereby the position of each fiber in said bundle is identifiable for selection by said control means.

12. The display device of claim 11, wherein said light source means includes a multiplicity of individual sources, each source being associated with an individual corresponding fiber.

13. The display device of claim 12, wherein said control means includes individual switch means for each source.

14. The display device of claim 11, wherein said light source comprises cathode ray tube means having a face, and means securing said inlet tips of said fibers adjacent said face.

15. The display device of claim 14, wherein said means securing said inlet tip comprises an aperture mask.

16. The display device of claim 15, wherein said aperture mask includes a multiplicity of apertures in a predetermined matrix, said inlet tips being secured in corresponding apertures, whereby activation of selected portions of the face of said cathode ray tube illuminates corresponding inlet tips to produce illumination at corresponding fiber outlet tips.

17. The display device of claim 16, wherein said control means includes means for regulating the motion and intensity of the electron beam in said cathode ray tube, whereby selected portions of said tube face can be illuminated to produce corresponding patterns of illumination in three dimensions within said display region.

18. The display device of claim 16, wherein said display region includes three dimensional reference axes.

* * * * *